United States Patent [19]

Greaves

[11] Patent Number: 5,188,341
[45] Date of Patent: Feb. 23, 1993

[54] SAFETY LATCH FOR A TIRE CARRIER

[75] Inventor: Jeffrey Greaves, Windsor, Canada

[73] Assignee: Fabricated Steel Products, Division of Indal Limited, Windsor, Canada

[21] Appl. No.: 639,542

[22] Filed: Jan. 10, 1991

[51] Int. Cl.$^5$ .............................................. B66D 1/00
[52] U.S. Cl. ........................................ 254/323; 414/466
[58] Field of Search ............... 254/323, 903, 269, 270; 414/463, 466; 224/42.23; 187/73

[56] References Cited

U.S. PATENT DOCUMENTS

| | | | |
|---|---|---|---|
| 3,529,152 | 11/1970 | Paul | 224/42.23 X |
| 3,856,167 | 12/1974 | Yasue et al. | 224/42.23 X |
| 4,249,682 | 2/1981 | Yasue et al. | 224/42.23 |
| 4,884,785 | 12/1989 | Denman et al. | 254/323 X |
| 4,915,358 | 4/1990 | Stallings | 224/42.23 X |

Primary Examiner—Daniel P. Stodola
Assistant Examiner—Tony A. Gayoso

[57] ABSTRACT

A safety mechanism for a winch assembly when storing a load, in a raised or stored position, such as a tire under a vehicle, or a boat on a trailer. The safety mechanism maintains a load in a retained position using a latching device that is activated by a lever when a cranking member engages a detent portion proximate the winch.

15 Claims, 3 Drawing Sheets

5,188,341

SAFETY LATCH FOR A TIRE CARRIER

FIELD OF THE INVENTION

This invention relates to safety devices which maintain a load in a retained position. More specifically this invention finds application for tires which are stored under a vehicle, having been raised to that position by a tire winch, which includes letting out and reeling in a resilient member such as a cable to move the tire from a lowered position to a stored position. A safety device is therefor provided, which ensures the tire remains in the stored position should the resilient member break.

BACKGROUND OF THE INVENTION

A great number of devices exists which raise and lower a load, and specifically a spare tire from a stored position underneath a vehicle to a lowered position for access by an individual. Conventionally the tire carrier may be pinned to the frame by nut and bolt or the like to retain the tire in a raised position, should a resilient member break.

U.S. Pat. No. 3,856,167 to Kabushiki Kaisha, describes and improved holding device for a spare tire which includes a tire carrier portion suspended from a chain so that a tire is retained in a stored position and is locked in position. The release of the lock is actuated by the rotation of the shaft 9 which causes the disengagement of the lever from the groove of the wheel support member. Therefore rotation of the operating shaft in the appropriate direction is what is required to raised and lower the spare wheel.

It would therefore be advantageous to provided a positive retention of the wheel in position should a resilient member break which is not dependent upon the rotation of the shaft and the mechanical reliability of all of the interrelated components, which are required for such a mechanism to work.

U.S. Pat. No. 4,884,785 to Deuer Manufacturing describes a securing mechanism for a spare tire which is normally disengaged from the carrier of the tire when the tire is in the raised position. Should the cable break locking pins are urged to engage the tire carrier and hold it in a raised position so the tire is not lost. This mechanism includes locking pins which are urged outwardly by springs. Should salt spray over a number of years degrade the quality of response of these pins, it is possible that the device may fail just when it is most needed.

Nowhere within the prior art is there found a simple latching device which is actuated when a cranking device engages a detent portion proximate the winch. No rotation of the shaft is required and the latch is always released prior to rotation of the shaft thereby simplifying the operation of the mechanism. When the cranking device is disengaged from the detent portion, the latch being resilient biased moves back to its latching position.

It is therefore an object of this invention to provided a safety device for a load carrier which is available at all times when the carrier is in the raised position.

It is a further object this invention to provide a safety device for a load carrier which is easy to use and is reliable.

Further and other objects of this invention will become apparent to a man skilled in the art when considering the following summary of the invention and the more detailed description of the preferred embodiments illustrated herein.

SUMMARY OF THE INVENTION

This invention provides a safety mechanism for a winch assembly when storing a load, in a raised or stored position such as a tire under a vehicle or a boat on a trailer. The invention finds particular application to a spare tire, but those skilled in the art will appreciate the broader benefits of such a structure when used with a winch assembly for other uses such as a boat winch for a trailer or any analogous use wherein it is desirable to ensure the confining of a load in the raised or stored position.

According to one aspect of the invention there is provided a safety device for a winch assembly, preferably for a spare tire storage assembly, the assembly including a winch affixed by mounting means proximate a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a confined stored position, preferably under a vehicle, to an unconfined accessible position remote and preferably below the stored position, the safety device comprising a carrier and preferably a tire carrier for carrying the load, for example the preferred spare tire installed on the hub, the carrier including a first portion and a second portion, the first portion for supporting the load, the preferred tire installed on a hub, and the second portion being integral with the first portion and affixed with the other end of the member remote the winch, the second portion of the carrier including a detent portion, (preferably a shoulder), the safety device having engaging means for said handle means, the engaging means for said handle means being affixed with the mounting means proximate the winch and having a preferably hollow portion, the preferably hollow portion of the engaging means having lever means associated therewith, the lever means being moveably affixed with respect to the mounting means, the safety device having resiliently biased latching means moveably affixed with respect to the mounting means, the lever means being interconnected with the latching means and being moveable from a first position when the handle means does not engage the engaging means to a second position whereat the handle means engages the engaging means, the latching means having detent means disposed therewith and moveable with the latching means by the lever means from a third position whereat the load, for example the preferred spare tire, is in the confined position, and the detent means of the latching means is disposed proximate the detent means of the second portion of the carrier to retain the carrier in the stored position and preclude the loss of the load should the member break, to a fourth position whereat the load, for example the preferred spare tire installed on a hub, is unconfined and free to move by the letting out or taking up of the member by the operation of the winch to and from the accessible position.

According to another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a confined stored position under a vehicle, to an unconfined accessible position below the stored position, the safety device comprising a tire carrier for carrying the spare tire installed on the hub, the carrier including a first portion for insertion within an opening in the hub and abutting the bottom of the hub, and a second shank portion having two ends and being affixed to the first portion proximate one end and having an expanded head proximate the other end, the first portion for supporting the spare tire installed on a hub, and the second shank portion being integral with the first portion and being affixed to the other end of the cable remote the winch proximate the head of the second shank portion, the head of the second shank portion of the carrier including a shoulder adjacent the shank portion, the safety device having a preferably hollow portion for engaging said handle, the preferably hollow portion being affixed with a mounting bracket proximate the winch, the preferably hollow portion having a lever associated therewith, preferably the lever including a cam surface for engaging the handle, the lever being moveably affixed with respect to a mounting bracket, the safety device having a resiliently biased pawl moveably affixed with respect to a mounting bracket, the lever being interconnected with the pawl and the lever being moveable from a first position when the handle does not engage the lever, and preferably the cam surface thereof, to a second position whereat the handle means engages the lever and moves the lever to the second position, the pawl having at least one finger and preferably two disposed therewith and moveable with the pawl by the lever from a third position whereat the spare tire is in the confined position, and the at least one finger of the pawl is disposed proximate the shoulder of the head of the second shank portion of the tire carrier to confine the tire carrier in the stored position and preclude the loss of the tire should the cable break, to a fourth position whereat the spare tire installed on a hub is unconfined and free to move by the letting out or taking up of the cable to and from the accessible position by the operation of the winch.

BRIEF DESCRIPTION OF THE DRAWINGS

The invention will now be illustrated with respect to the following drawings illustrating embodiments of the invention in which.

DETAILED DESCRIPTION OF PREFERRED EMBODIMENTS OF THE INVENTION

Figure 1:
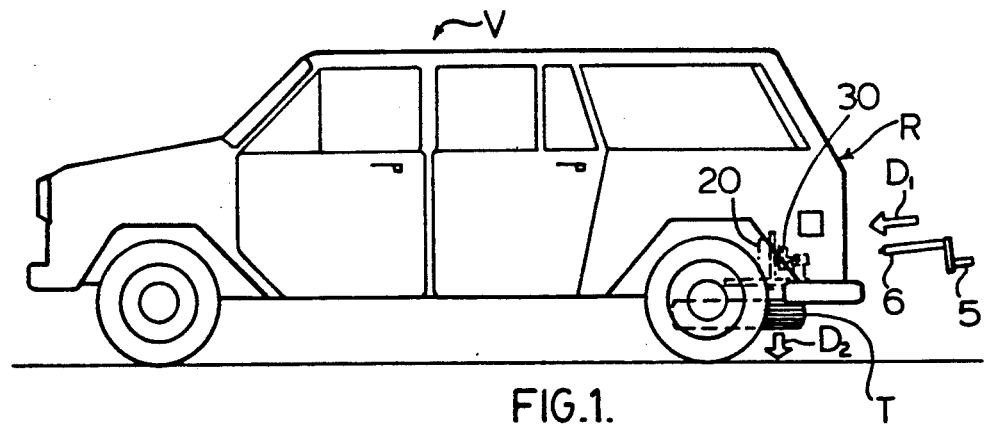
FIG. 1 is a side plan view of a vehicle upon which the invention is installed.

Referring now to FIG. 1 there is illustrated a vehicle V having a winch assembly 20 mounted therewith. Separate from the winch assembly is a torque limiter 30 which may also be integral with the winch. The tire T is conveniently stored under the vehicle V until such time as a user accesses the tire by lowering the tire using the crank handle 5 at the end 6 and inserting it to access the torque limiting device 30 attached to the winch 20. The tire T may then be moved in a direction D2 to lower the tire to the ground. Handle 5 is inserted in a direction D1 in the sleeve 40A wherein a latching mechanism generally referred to as 40 is disposed. The end of the handle 6 engages the cam surface 42a of the lever 40 which is connected to the rod 43 at the end 41. The rod 43 is connected to a latching mechanism 45 at the end 44 thereof. Therefore the latching mechanism 45 rotates in response to the movement of the lever 40 to unconfine the shoulder 51 of the head of the shank portion 50 so that the tire carrier portion and the tire may be lowered to the ground. It is preferred in the stored position that the latch 45 does not engage the shoulder 51 in normal use to prevent binding of the latch in motion.

The assembly includes a mounted plate 29 to which a hollow cylinder 40a is attached, by attaching portions 40b to the bracket 29. When the end 6 of the crank 5 therefore is inserted in the cylinder 40a end 6 abuts the lever cam portion 42a which lever 40 is pivoted at pivot 42, the use of which will be described hereinafter. Therefore the end 6 of the crank 5 is inserted through to the hollow shaft portion 35 which receives the end 6 of the crank handle 5. The torque limiter 30 therefore includes two outer housing portions 35a and 36a. The half 35a includes the hollow shaft portion 35 which half 35a connects to the half 36a which connects to the shaft 36 which continues on to the winch portion 20.

Figure 5:
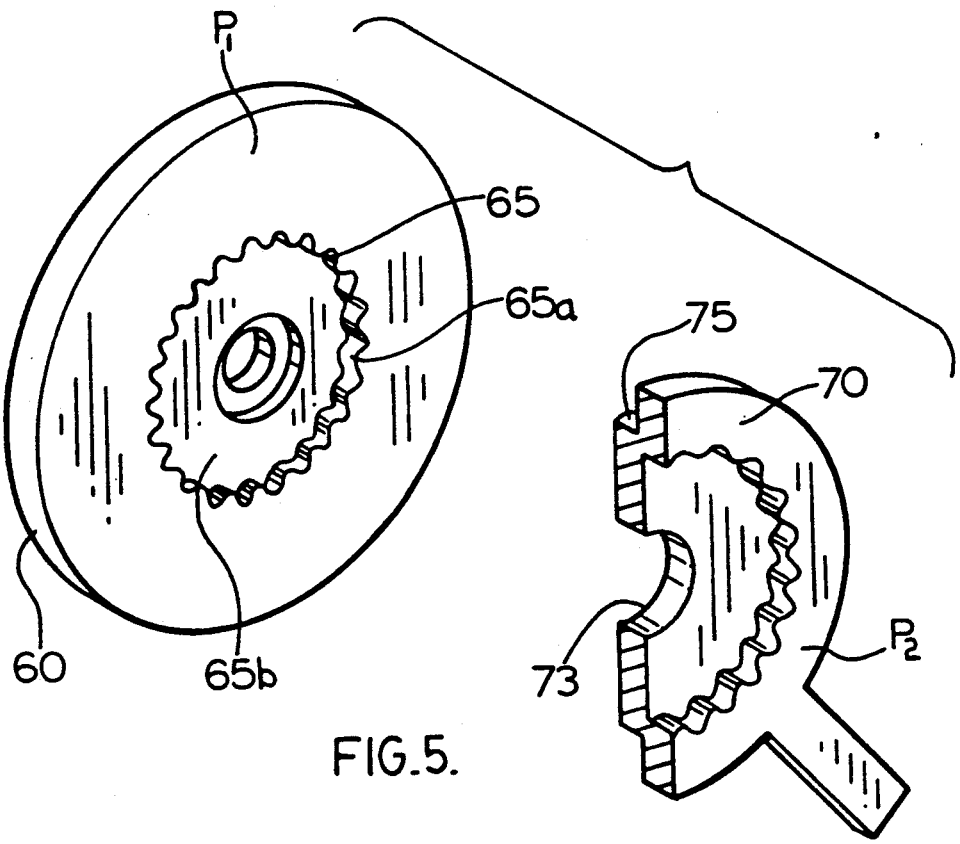
FIGS. 5 and 6 are perspective and side views respectively of the reduction gears of the winch illustrated in a preferred embodiment of the invention.
Figure 6:
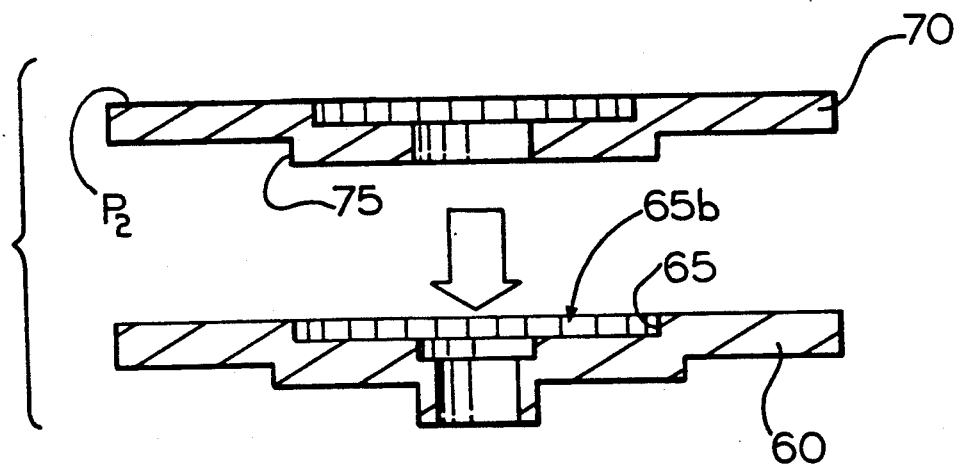

The shaft 36 then continues on to a typical winch including a reel 25. The winch 20 includes a housing 21 mounted to the mounting bracket 15 which winch 20 includes gear reduction portion 70 and 60 as best seen in FIGS. 5 and 6 which are used for speed reduction purposes. The use of these gears will be described hereinafter. A resilient cable 28 is wound on to and off of the reel 25 by the rotation of the crank 5 in the required direction. Any winch structure would suffice and the details of the winch are not provided for this reason. The important portions of the invention are the lever portion 40 and the related latching portion 45 which are actuated by the insertion of the end 6 of the crank arm 5 through the cylinder 40a.

Disposed below the mounting plate 29 is a extension portion 17. The shank portion 50a and the head 50 having shoulder adjacent the shank portion 50a are contained within this frame portion 17 when the tire is retained in its stored position. The latching portion 45 therefore rotates to adjacent the shoulder portion 51 of the tire carrier 50 which confines and retains the tire in the stored position should the cable 28 break. The latch mechanism does not normally carry the load of the tire in the normal stored position. This normal retention is accomplished by the cable only.

The tire T is attached to a rim T1 at flanges T2 as is typically known in the art. The tire is confined in the stored position by the latch 45 being disposed adjacent to the shoulder 51 of the head affixed to the shank 50a and having a flange 53 extending underneath the rim T1. This flange 53 raises and lowers the tire T from the stored position to the accessible position as the cable 28 is wound out or wound in. A spring biased device 54 which abuts the flange 54a is provided to retain the correct tension in the unit. This is well known in the art.

When the crank 5 is inserted toward the winch 20 the end 6 of the crank arm passes through the sleeve 40a and abuts the lever 40 at the cam surface 42a thereof to cause such lever 40 to rotate at its pivot 42 and causes the rod 43 attached to the crank or lever 40 at the end 41 to move in a direction compatible to D1 and link with the latch mechanism 45 at point 44. Therefore as the rod 43 moves in the direction D1 it causes the latch mechanism 45 pivoted at 46 via cam portion 47 to pivot in a direction D3 as best seen FIG. 3. Therefore the confining fingers 49 are removed from recess 17A of the frame portion 17 disengaging the finger portions 49 from underneath the shoulder 51 of the head portion 50 of the tire carrier 52.

The rotation of the latch in direction D3 allows the unconfined lowering of the shoulder portion 51 of the tire carrier 52. The tire is shown in the accessible position about to be cranked up to its stored position and latched when handle 5 is removed from the cylindrical portion 40a to release the detent portion 42a and thereby allow the latch portion to return to its confined position under the shoulder 51 of the carrier 52 wherein the fingers 49 are disposed under the shoulder 51 proximate the abutting arcuate surface 44 thereof wherein the tire is therefore in the confined position should the cable break. It is highly recommended that there be a clearance of some minimum value to ensure that the latching fingers 49 do not engage the shoulder 51. If they did then the reliability of the latch operation would be less predictable which is undesirable.

Figure 2:
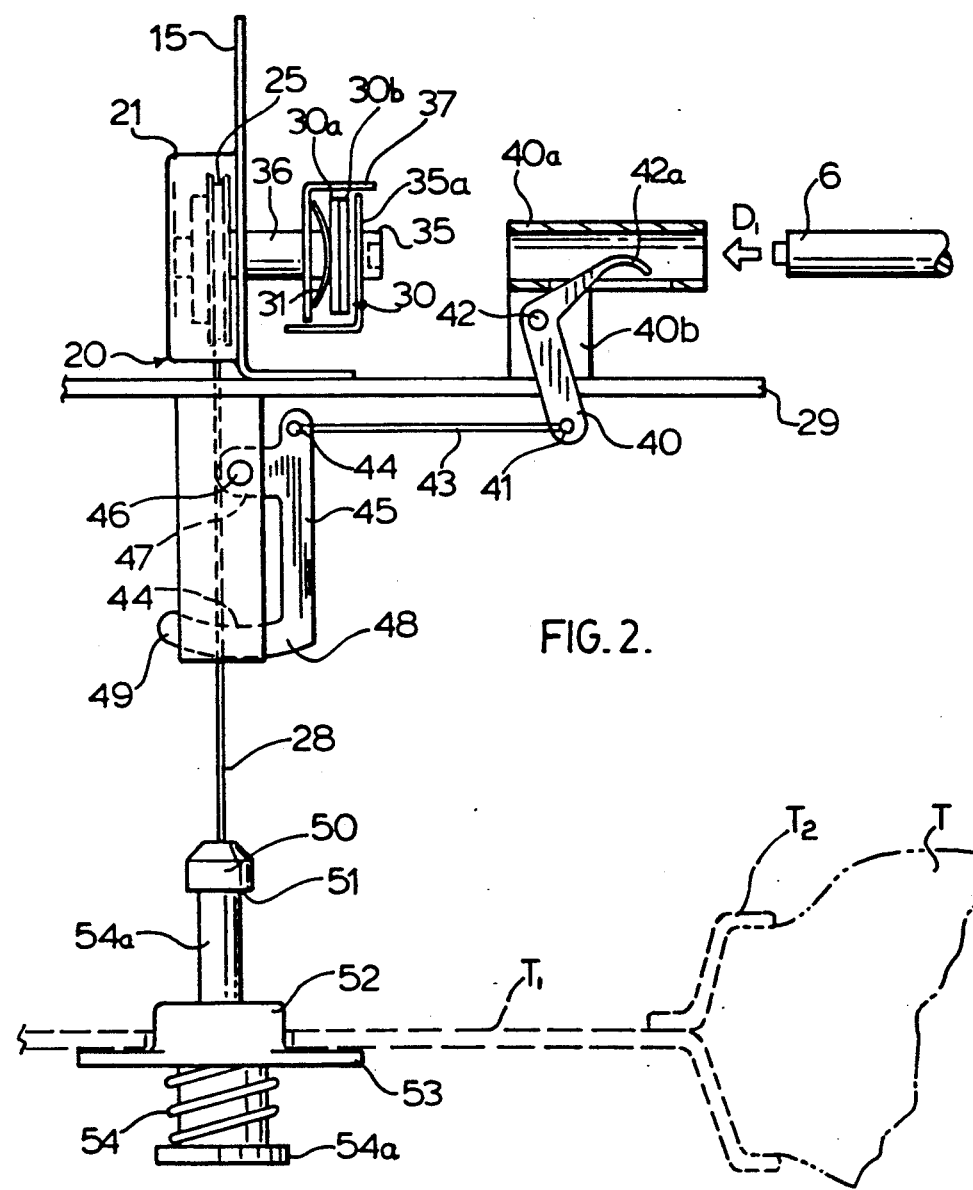
FIG. 2 is a side plan view of the winch assembly of FIG. 1 illustrating the latching mechanism thereof for confining a tire in a stored position under a vehicle and illustrated in a preferred embodiment of the invention.
Figure 3:
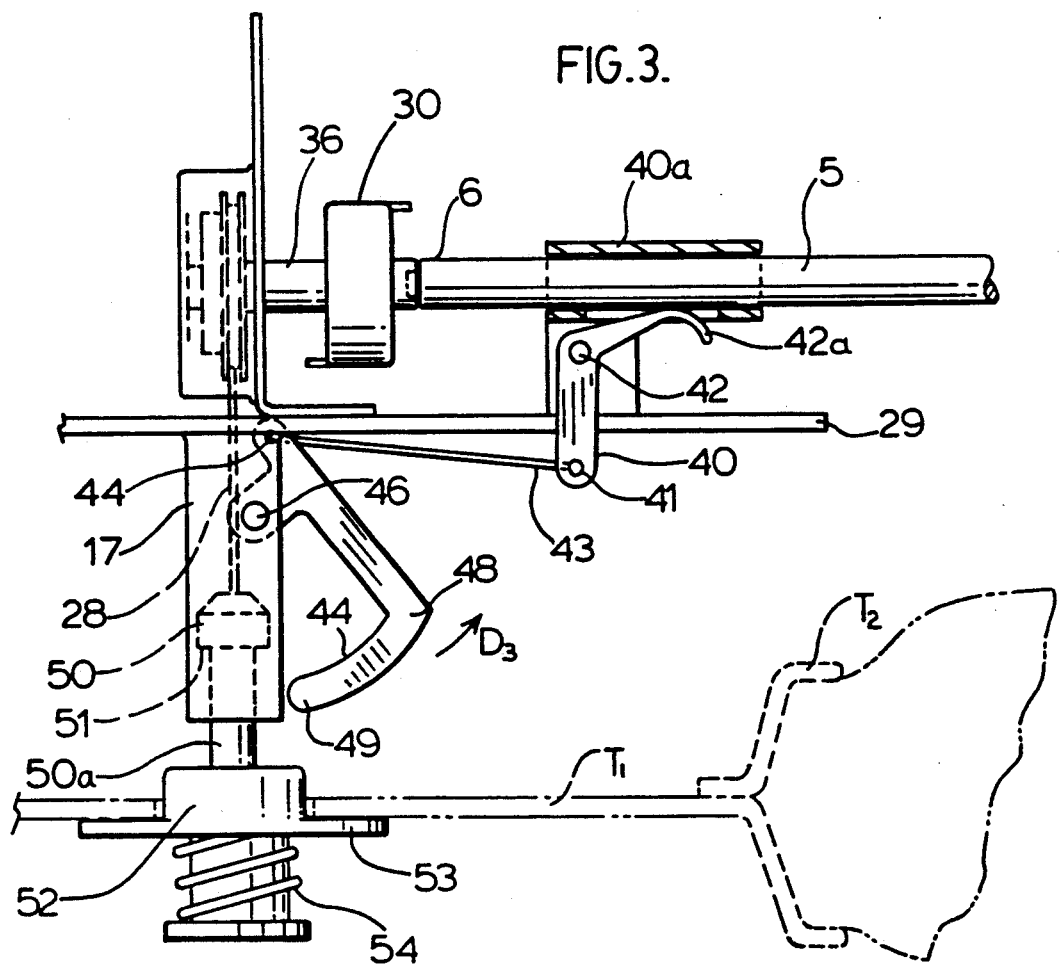
FIG. 3 is a view similar to that of FIG. 2 illustrating the action for unconfining the securing mechanism of the winch assembly when a crank is inserted for operation of the winch illustrated in a preferred embodiment of the invention.
Figure 4:
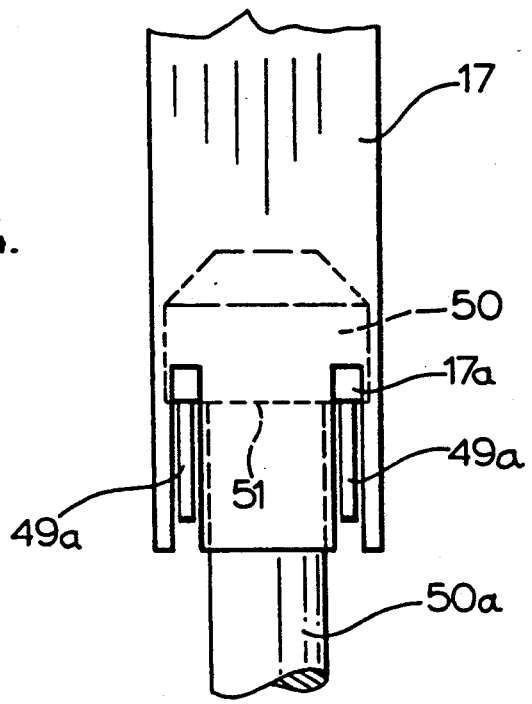
FIG. 4 is a close up view of the latching portion 49 illustrated in perspective and a top plan view of winch 20 illustrated in a preferred embodiment of the invention.

Referring now to FIGS. 2 and 3 it can be readily seen that the torque limiting device 30 is contained separately from the winch assembly 20. Therefore the torque limiting device 30 includes two halves 36a and 35a which contain the torque limiting plates 30a and 30b which engage at all times and are held in constant engagement by a belleville spring 31. Therefore the portion 36a and 35a The shaft 35 is affixed for example by welding to portion 35a. The portion 35a and the torque plates 30a and 30b are also pressed against the other halve of the housing 36a. The portions 37 are used for connecting the two plates 35a and 36a loosely together. Therefore when the shaft 5 at end 6 is inserted within the hollow of the shaft 35 and turned the housing portion 36a and the shaft 36 which engages the winch 20 are also rotated. The torque limiting plates 30a and 30b include a multiplicity of teeth, which at a predetermined torque, the plates slip with respect to one another and thus provide overload protection for the winch 20. The torque limiting device 30 is a supplement to any winch and it may provide an add on package for a winch which has no torque overload protection by merely inserting this package 30 on a convenient shaft in between the housing 20 and the handle.

Referring now to FIGS. 5 and 6 there are illustrated ring gear portion 60 stamped from a metal disk wherein the recess 65 including the teeth 65a are produced by stamping the ring gear 60 so as to raise a portion thereof out of the plane P1 of the ring gear 60. Similarly the planetary gear portion 70 includes teeth 75 which are formed by raising the teeth 75 out of the plane P2 of the planetary gear 70. In doing so a pocket is provided behind the section having the teeth 75 thereon. This therefore provides a simple method of forming a ring gear and a planetary gear which is easy to manufacture. The ring and planetary gear inter fit as best shown in FIG. 6 wherein the teeth 75 which extends laterally away from the plain P2 of the ring gear 70 are inserted within the opening 65b of the ring gear 60 so that the teeth 65 of the ring gear engage the teeth 75 of the planetary gear. Within the winch 20 there is an offset which is inserted within the opening 63 of the ring gear 60 so that the planetary gear may wobble about the opening 73 therein and thus provide gear reduction which is known as taumel gear reduction. Therefore within the winch 20 there is provided taumel gear reduction portions including a ring gear 60 and an planetary gear 70 which are manufactured by a stamping process from flat circular plates and having teeth on the ring gear and teeth on the planetary gear which inter engage having been formed by metal stamping techniques. Generally there is one less tooth formed with the planetary gear than the ring gear to effect the taumel principle.

As many changes can be made to the invention without departing from the scope of the invention, it is intended that all material contained herein by interpreted as illustrative of the invention and not in a limiting sense.

The embodiments of the invention in which an exclusive property or privilege is claimed are as follows:

1. A safety device for a winch assembly, the assembly including a winch affixed by means for mounting the winch proximate a stored position for a load, he winch by the operation of handle means for letting out and taking up a length of a member affixed at one end to the winch, which letting out and taking up of the member moves the load from a confined stored position, to an unconfined accessible position remote the stored position, the safety device comprising a carrier for carrying the load, h carrier including a first portion and second portion, the first portion for supporting the load, and the second portion being integral with the first portion and affixed with the other end of the member remote the winch, the second portion of the carrier including a detent portion, the safety device having means or engaging said handle means, the means for engaging said handle means being affixed with the means or mounting the winch proximate the stored position and having a portion having means for levering means for latching the detent portion associated therewith, the means for levering means for latching the detent portion being moveably affixed with respect to the means for mounting the winch, the safety device having resiliently biased means for latching the detent portion moveably affixed with respect to the means for mounting the winch, the means for levering means for latching the detent portion being interconnected with the means for latching the detent portion and being moveable from a first position when the handle means does not engage the means for engaging said handle means to a second position whereat the handle means engages the means for engaging said handle means, the means for latching the detent portion having detent means disposed therewith and moveable with the means for latching the detent portion by the means for levering the latching means for the detent portion from a third position whereat the load is in the confined position, and the detent means of the means for latching detent portion is disposed proximate the detent portion of he second portion of the carrier to retain the carrier in the stored position and preclude the loss of the load should the member break, to a fourth position whereat the load is unconfined and free to move by the letting out or taking up of the member by the operation of the winch to and from the accessible position.

2. The safety device for a winch assembly of claim 1 wherein the load is a spare tire.

3. The safety device for a winch assembly of claim 2 wherein the spare tire is installed on a hub.

4. The safety device for a winch assembly of claim 1 wherein the member being let out and taken up is a cable.

5. The safety device for a winch assembly of claim 1 or 4 wherein one end of the member is affixed to a reel associated with the winch.

6. The safety device for a winch assembly of claim 2 or 3 wherein the accessible position is under a vehicle.

7. The safety device for a winch assembly of claim 6 wherein the accessible position is below the stored position.

8. The safety device for a winch assembly of claim 2, or 3, wherein the carrier for the load is a tire carrier.

9. The safety device for a winch assembly of claim 1 wherein the detent means of the second portion of the carrier is a shoulder.

10. The safety device for a winch assembly of claim 1 wherein the portion of the means for engaging said handle means is hollow.

11. A safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch, which letting out and taking up of the cable moves the spare tire, installed on a hub, from a confined stored position under a vehicle, to an unconfined accessible position below the stored position the safety device comprising a tire carrier for carrying the spare tire installed on the hub, the carrier including a first portion for insertion within an opening in the hub and abutting the bottom of the hub, and a second shank portion having two ends and being affixed to the first portion proximate one end and having an expanded head proximate the other end, the first portion for supporting the spare tire installed on a hub, and the second shank portion being integral with the first portion and being affixed to the other end of the cable remote the winch proximate the head of the second shank portion, the head of the second shank portion of the carrier including a shoulder adjacent the shank portion, the safety device having a portion for engaging said handle, the portion being affixed with a mounting bracket proximate the winch, the portion having a lever associated therewith, the lever being moveably affixed with respect to a mounting bracket, the safety device having a resiliently biased pawl moveably affixed with respect to a mounting bracket, the lever being interconnected with the pawl and the lever being moveable from a first position when the handle does not engage the lever to a second position whereat the handle means engages the lever and moves the lever to the second position, the pawl having at least one finger disposed therewith and moveable with the pawl by the lever from a third position whereat the spare tire is in the confined position, and the at least one finger of the pawl is disposed proximate the shoulder of the head of the second shank portion of the tire carrier to confine the tire carrier in the stored position and preclude the loss of the tire should the cable break, to a fourth position whereat the spare tire installed on a hub is unconfined and free to move by the letting out or taking up of the cable to and from the accessible position by the operation of the winch.

12. The safety device for a winch assembly of claim 11 wherein one end of the cable is affixed to a reel associated with the winch.

13. The safety device for a winch assembly of claim 11 wherein the portion for engaging said handle is hollow.

14. The safety device for a winch assembly of claim 11 or 13 wherein the lever includes a cam surface for engaging the handle.

15. The safety device for a winch assembly of claim 11 wherein the number of fingers of the pawl is two.

* * * * *